United States Patent

[11] 3,589,503

[72] Inventor John M. Leach
 P.O. Box 341, Belle Terre, Port Jefferson, N.Y. 11777
[21] Appl. No. 831,382
[22] Filed June 9, 1969
[45] Patented June 29, 1971

[54] MATERIAL HANDLING CONVEYORS
 7 Claims, 5 Drawing Figs.
[52] U.S. Cl. .................................................. 198/177
[51] Int. Cl. .................................................. B65g 17/20
[50] Field of Search .......................................... 198/157, 177

[56] References Cited
UNITED STATES PATENTS
2,893,540 7/1959 Freeman .................. 198/177
3,266,620 8/1966 Skinner .................... 198/177

Primary Examiner—Evon C. Blunk
Assistant Examiner—Johnny D. Cherry

ABSTRACT: The present invention relates to endless conveyors frequently used for carrying objects overhead and of the enclosed track type in which the track is a four-sided box in cross section usually square or slightly rectangular. The trolleys which run inside the track are alternately provided with vertical wheels and horizontal wheels considered when the track is running horizontally. Hooks extend from the vertical wheel trolleys through a slot formed usually in the bottom section of the track and support the objects conveyed. The horizontal wheels contact one or the other of the vertical sections of the track and eliminate excessive rubbing friction between the trolleys and the track.

The horizontal wheel trolleys are provided with at least two horizontal wheels positioned one after the other or in tandem in the direction of the trolley travel for sequential contact with the track which on horizontal curves cause the ends of these trolleys to move away from the convex side of the curved track on the inside of the track, which action forces each vertical wheel trolley connected between two two-wheeled trolleys to be bodily moved away and held out of contact with the convex side which eliminates all rubbing friction completely.

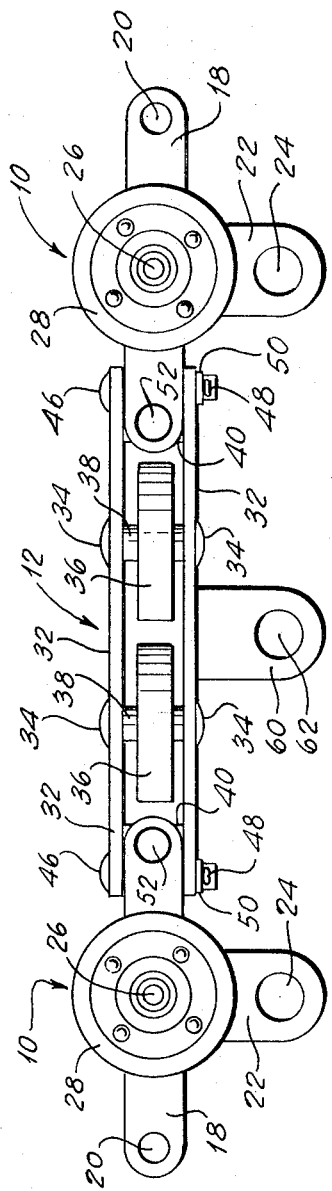
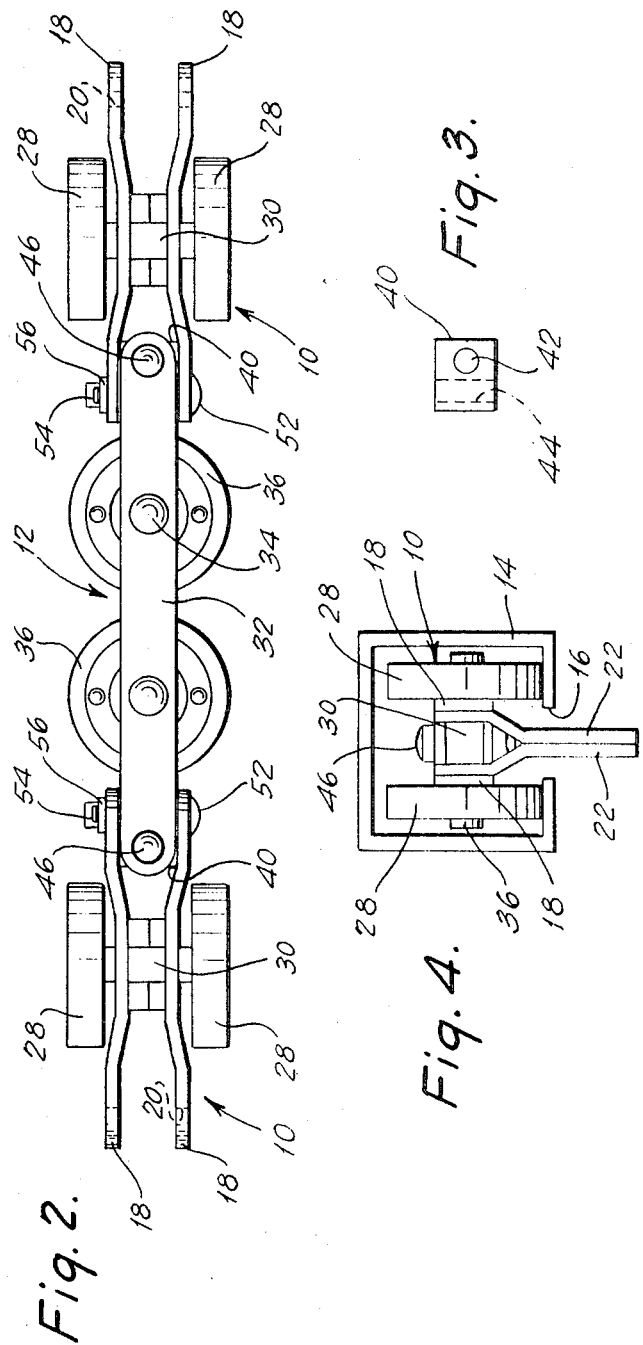
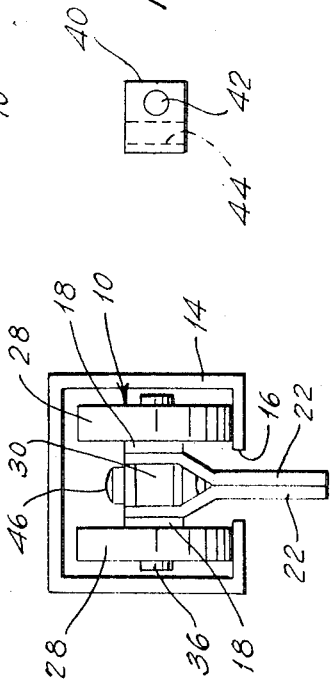

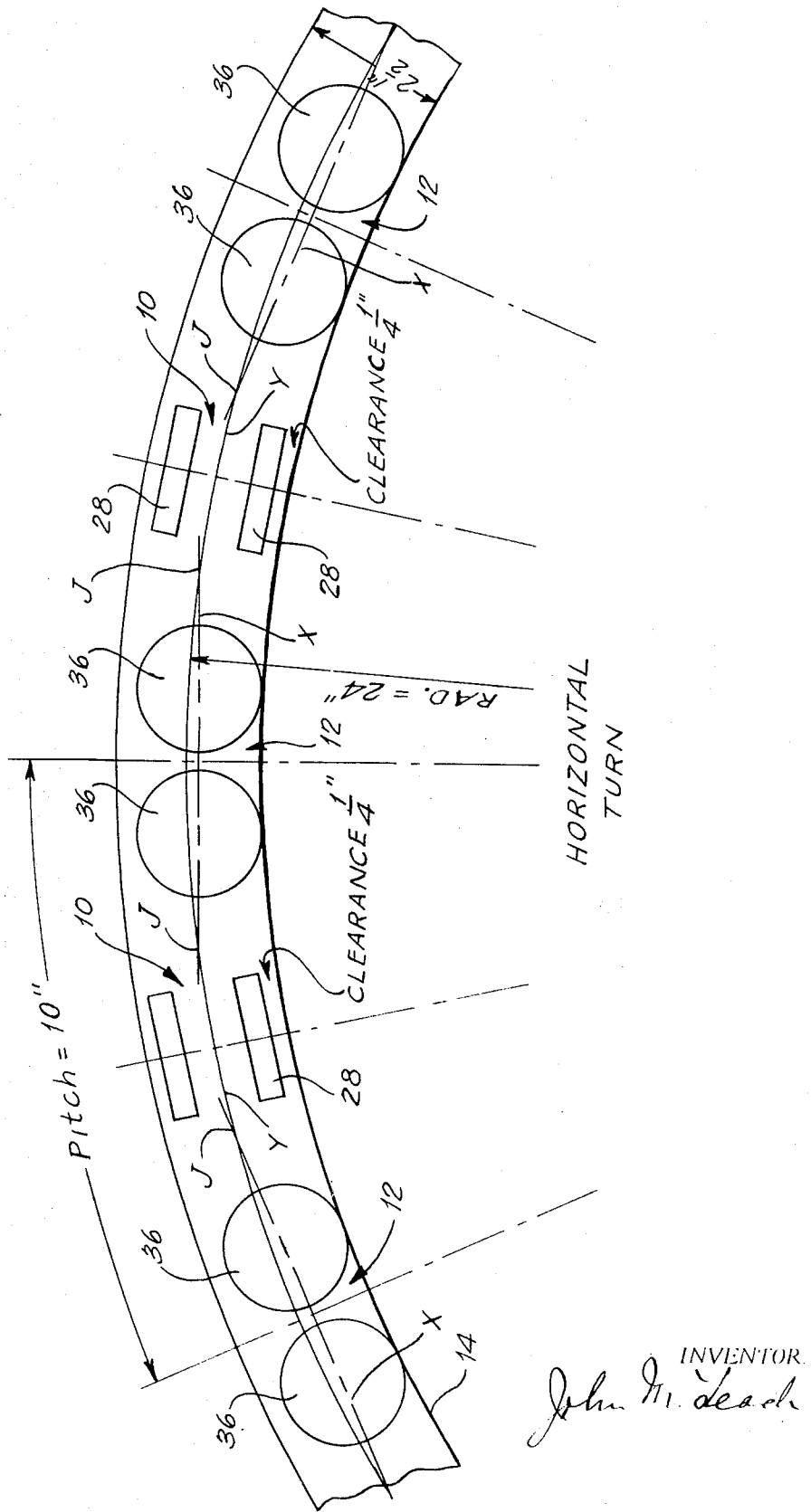

MATERIAL HANDLING CONVEYORS

Enclosed track endless conveyors are desirable because, being entirely enclosed, they present an attractive appearance and are much safer than open conveyors because workers can not accidentally get their hands into the trolleys. They also eliminate the need for traction wheel or sprocket turns which reduces original cost and maintenance time. They have been subject to rapid wear, however, because the vertical wheels and shafts almost always rub on the convex sides of horizontal turns inside of the track and produce increased chain pull. This increases the wear all over the unit and particularly on the convex sidewalls and on the horizontal wheels, each of which on each horizontal turn is forced to carry a bearing load which is many times any given unit load conveyed.

It is an object of the present invention to provide an enclosed track conveyor in which all rubbing contact between trolleys and track is completely eliminated.

It is a another object of the present invention to provide an enclosed track conveyor in which the side thrust of the trolleys caused by the chain pull is absorbed by at least two wheels on each trolley subjected to such side thrust.

It is a further object of the present invention to provide an enclosed track conveyor in which the same two or more wheels which divide the side thrust caused by the chain pull between them also cause the ends of the trolleys which carry these wheels to move away from the convex inside of the track on horizontal turns and in turn move the vertical wheel trolleys completely out of contact with the convex inside of the track.

Other objects and advantages of the present invention will become apparent to those skilled in the art upon recourse to the following detailed description of what is now considered the preferred embodiment of the invention, taken in connection with the drawings, in which:

FIG. 1 is a side elevational view of the conveyor trolleys forming the chain;

FIG. 2 is a plan view of the trolleys shown in FIG. 1;

FIG. 3 is a side view of an articulation joint block used to connect successive trolleys;

FIG. 4 is an end view of an open section of the track showing a vertical wheel trolley in position therein, and FIG. 5 is a diagrammatic plan view of a horizontal curve showing how the horizontal trolleys function in moving the vertical trolleys away from the convex wall of the inside of the track.

Referring to FIGS. 1 and 2, the conveyor chain of the present invention is made up of alternate trolleys 10 and 12 which for convenience of explanation will be termed vertical and horizontal trolleys, respectively. This of course refers to the positions of these trolleys when the chain is running in a horizontal position but it is to be understood that the chain can run in any direction desired including vertical.

The track is shown at an open end and designated 14 in FIG. 4 with the chain in position therein. It is formed in the cross-sectional shape of a box having vertical sides and horizontal sides with a slot 16 extending the length of one side. The vertical sides provide guide areas for the horizontal wheels and the right angularly disposed horizontal sides provide guide areas for the vertical wheels.

Each vertical trolley is formed of two sideplates 18 provided at each end with a hole 20 and in the center with bottom extensions 22 which are brought together as shown so as to form a work support which is provided with a hole 24 to receive a hook or the like.

Each plate 18 is formed with a hole at the center to receive a shaft 26 which also carries two wheels 28 which form the vertical wheels. These wheels are fastened on the shaft 26 as by lightly peening over the ends of the shaft. A spacer 30 is positioned on each shaft 26 between the plates 18 so that the entire trolley is fastened into an assembled component by peening over the ends of the shaft 26.

Each horizontal trolley is formed of two sideplates 32 formed with a hole at each end and two holes intermediate the end holes. Each intermediate hole receives a rivet 34 which also serves as a shaft for an horizontal wheel 36 which may be physically the same wheel as 28. Suitable spacers 38 are also placed over the rivets 34 to substantially center the wheels 36 between the plates 32. When the rivets 34 are suitably headed over the trolley 12 is fastened into a rigid frame assembled component.

The trolleys 10 and 12 are interconnected by articulation joints comprising blocks 40, each provided with through openings 42 and 44 placed at right angles to each other. These blocks are positioned between the ends of plates 18 and 32 as shown and pins 46 are placed through the holes in the plates 32 and through the vertical holes 44 and secured by cotter keys 48. Washers 50 are placed over the pins 46 before the cotter keys 48 are inserted.

Pins 52 are passed through the holes 20 in the ends of the plates 18 and the openings 42 in the blocks 40 and secured by cotter keys 54. Washers 56 are placed over the pins 52 before the cotter keys 54 are inserted.

As shown in FIG. 3 the holes 42 and 44 are formed very close together in order to shorten distances between the load bearing hangers as much as possible. In view of the fact that the sideplates 18 and 32 are free to pivot on the pins 46 and 52 these pins are not forced to turn in the blocks 40.

It will be noted that the articulation joints just described are of the two axis of articulation type in which the axes are substantially perpendicular and mutually displaced instead of lying in the same plane. This displacement causes the ends of the plates 18 and 32 of the trolleys 10 and 12, respectively, to be overlapped which causes each trolley to have a longer effective length than would be possible if the trolley sideplates were not overlapped. The effective length is the distance measured along each plate between the centers of its pivot pins 46 or 52.

It is preferred that the effective length of the horizontal trolleys 12 be made longer than the effective length of the vertical trolleys 10. Probably best results are obtained when the trolleys 12 are in excess of 50 percent longer than the trolleys 10. This causes the ends of the trolleys 12 to move a considerable distance away from the convex area of a vertical sidewall of the track 14 on a horizontal turn. This causes the trolleys 10 to be moved a substantial distance away from the said convex area to prevent any rubbing contact therewith. Because the trolleys 12 can not rock or seesaw on their wheels because there are two of them to each trolley, the trolleys 10 are positively held away from contact with the said convex area on a horizontal turn.

The longer effective length of the trolleys 10 is desirable because this enables the trolleys 10 to hold the trolleys 12 up off of the convex guide area of a bottom side of the track 14 on a vertical turn and thus eliminates all rubbing contact between the trolleys 12 and the track.

Although the articulation joints described above are preferred for the reasons given, other types of articulation joints can be used without departing from the scope of this invention.

In order to more clearly describe and illustrate the action of the horizontal trolleys 12 in moving and positively holding the vertical trolleys 10 away from contact with convex areas of the sidewall of the vertical sides of the track 14 a stripped down diagrammatic horizontal plan view of a track curve has been shown in FIG. 5. In order to give significance to the relative positions of the trolleys 10 and 12 it was necessary to select dimensions and make this diagram to scale which is one-half scale. The dimensions selected are practical for a functional conveyor but are otherwise entirely arbitrary and in no respect limitative as many other combinations of dimensions can be used. The centerline of the track horizontal curve 14 is on a radius of 24 inches; the inside width of the track is 2½ inches; the wheels 28 and 36 are 2¼ inches in diameter, and the pitch between like trolleys is 10 inches. The centerline of the trolleys 12 are shown at X; the centerlines of the trolleys 10 are shown at Y, and the articulation points between the trolleys 10 and 12 are shown at J. The force of the chain pull naturally occurs along these centerlines.

With the given dimensions, the clearance between the nearest point on any vertical trolley 10 and the adjacent track convex guide area surface is one-fourth inch which is the position at which the trolley 10 is positively held throughout the duration of the curve. This makes for an exceptionally smooth and effortless movement of the conveyor chain and results in an absolute minimum of wear throughout the system and a maximum of carrying capacity for the conveyor.

Where desired, a lug 60 having a hanger hole 62 can be suitably attached to the bottom plate 32 of each horizontal trolley 12 to provide intermediate supports.

The chain of the present invention is driven by either a sprocket or caterpillar chain drive which in and of themselves form no part of the present invention and have not been illustrated.

The foregoing is to be construed as descriptive and not limitative as many changes and modifications can be made in the physical embodiment of the invention without departing from its scope.

The invention having been described, what is claimed is:

1. A conveyor comprising a track having in cross section approximately right angularly disposed trolley guide areas, said track also having curved sections, two rigid frame trolleys, two wheels carried at points spaced inwardly of the ends of the rigid frame by each of said trolleys and positioned in tandem for sequential contact with one of said track guide areas in the direction of trolley travel when said guide area makes a convex turn to guide said trolleys around said convex turn while positively moving both ends of the rigid frame of each of said trolleys away from the convex turn area, a third trolley disposed between adjacent ends of said rigid frames of said two aforementioned trolleys, at least one wheel carried by said third trolley to guide said third trolley along said track guide area which in cross section of the track is substantially at right angles to said convex turn guide area, and an articulation connection between said adjacent ends of said rigid frames of said two first-mentioned trolleys and the ends of said third trolley, whereby the third trolley is moved away from and positively held out of contact with said convex turn area by said two first mentioned trolleys.

2. A conveyor as specified in claim 1 further characterized in that one of said track guide areas has a continuous slot extending therealong.

3. A conveyor as specified in claim 2 further characterized in that said third trolley is provided with a load support extending through said slot.

4. A conveyor as specified in claim 1 further characterized in that each of said two first-mentioned trolleys are longer than said third trolley.

5. A conveyor as specified in claim 4 in which each of said two first-mentioned trolleys is more than 50 percent longer than said third trolley.

6. A conveyor as specified in claim 1 in which said articulation connection is of the two, substantially perpendicular axis of articulation type in which the axes are mutually displaced and joined ends of the trolleys are overlapped so as to increase the effective length of all trolleys, which enables a guiding trolley always to move an adjacent nonguiding trolley further away from the convex guiding area than would be possible if the trolley ends were not overlapped.

7. A conveyor as specified in claim 6 further characterized in that a perpendicularly drilled joint block is positioned between adjacent trolleys.